(12) United States Patent
Horikawa et al.

(10) Patent No.: US 12,211,249 B2
(45) Date of Patent: Jan. 28, 2025

(54) IMAGE PROCESSING DEVICE, IMAGE PROCESSING METHOD, AND PROGRAM

(71) Applicant: SONY INTERACTIVE ENTERTAINMENT INC., Tokyo (JP)

(72) Inventors: Tsutomu Horikawa, Kanagawa (JP); Daichi Ono, Kanagawa (JP); Hiroyuki Yabe, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 495 days.

(21) Appl. No.: 17/619,615

(22) PCT Filed: Jul. 12, 2019

(86) PCT No.: PCT/JP2019/027670
§ 371 (c)(1),
(2) Date: Dec. 16, 2021

(87) PCT Pub. No.: WO2021/009798
PCT Pub. Date: Jan. 21, 2021

(65) Prior Publication Data
US 2022/0292811 A1 Sep. 15, 2022

(51) Int. Cl.
*G06V 10/764* (2022.01)
*G06T 7/73* (2017.01)
(Continued)

(52) U.S. Cl.
CPC ............. *G06V 10/764* (2022.01); *G06T 7/73* (2017.01); *G06V 10/267* (2022.01); *G06V 20/41* (2022.01);
(Continued)

(58) Field of Classification Search
CPC .... G06V 10/764; G06V 10/267; G06V 20/64; G06V 10/82; G06F 18/214
See application file for complete search history.

(56) References Cited

U.S. PATENT DOCUMENTS 10,839,530 B1 * 11/2020 Berger .................... G06N 20/00
11,100,669 B1 * 8/2021 Zhou ...................... G01S 13/867
(Continued)

OTHER PUBLICATIONS

Notice of Reasons for Refusal dated Sep. 13, 2022, from Japanese Patent Application No. 2021-532559, 3 sheets.
(Continued)

*Primary Examiner* — John B Strege
(74) *Attorney, Agent, or Firm* — XSENSUS LLP

(57) ABSTRACT

Provided are an image processing device, an image processing method, and a program for recognizing an object in a three-dimensional map, which do not require collecting learning data of the three-dimensional map and can perform high-speed processing with a small load. The image processing device includes an image acquiring section that sequentially acquires a two-dimensional input image for each frame; an object type recognition executing section that attaches, to each of pixels of the input image acquired for each frame, a label indicating a type of an object represented by the pixels; and a labeling section that executes three-dimensional position recognition of a subject represented in the input image to create a three-dimensional map, based on the input image sequentially input, and attaches, to each voxel included in the three-dimensional map, the label of the pixel corresponding to the voxel.

17 Claims, 4 Drawing Sheets

(51) Int. Cl.
  *G06V 10/26* (2022.01)
  *G06V 20/40* (2022.01)
  *G06V 20/64* (2022.01)
  *G06V 30/19* (2022.01)

(52) U.S. Cl.
  CPC ........ *G06V 20/64* (2022.01); *G06V 30/19127* (2022.01)

(56) References Cited

U.S. PATENT DOCUMENTS

| | | | | |
|---|---|---|---|---|
| 2014/0002597 | A1* | 1/2014 | Taguchi | G06T 7/74 348/43 |
| 2019/0043203 | A1* | 2/2019 | Fleishman | G06F 18/29 |
| 2019/0108639 | A1* | 4/2019 | Tchapmi | G06T 7/10 |
| 2020/0118331 | A1* | 4/2020 | Georgiou | G06T 17/00 |
| 2020/0191593 | A1* | 6/2020 | Herman | G01C 21/362 |
| 2020/0193611 | A1* | 6/2020 | Morrison | G06V 20/52 |
| 2021/0287037 | A1* | 9/2021 | Chen | G06V 10/82 |
| 2023/0186647 | A1* | 6/2023 | Mahata | G06V 10/26 382/103 |

OTHER PUBLICATIONS

International Search Report and Written Opinion mailed Aug. 27, 2019, from PCT/JP2019/027670, 8 sheets.

Tateno, Keisuke et al., CNN-SLAM: Real-time dense monocular SLAM with learned depth prediction, 2017 IEEE Conference on Computer Vision and Pattern Recognition, 2017, pp. 6565-6574, 3 sheets.

* cited by examiner

F I G . 2
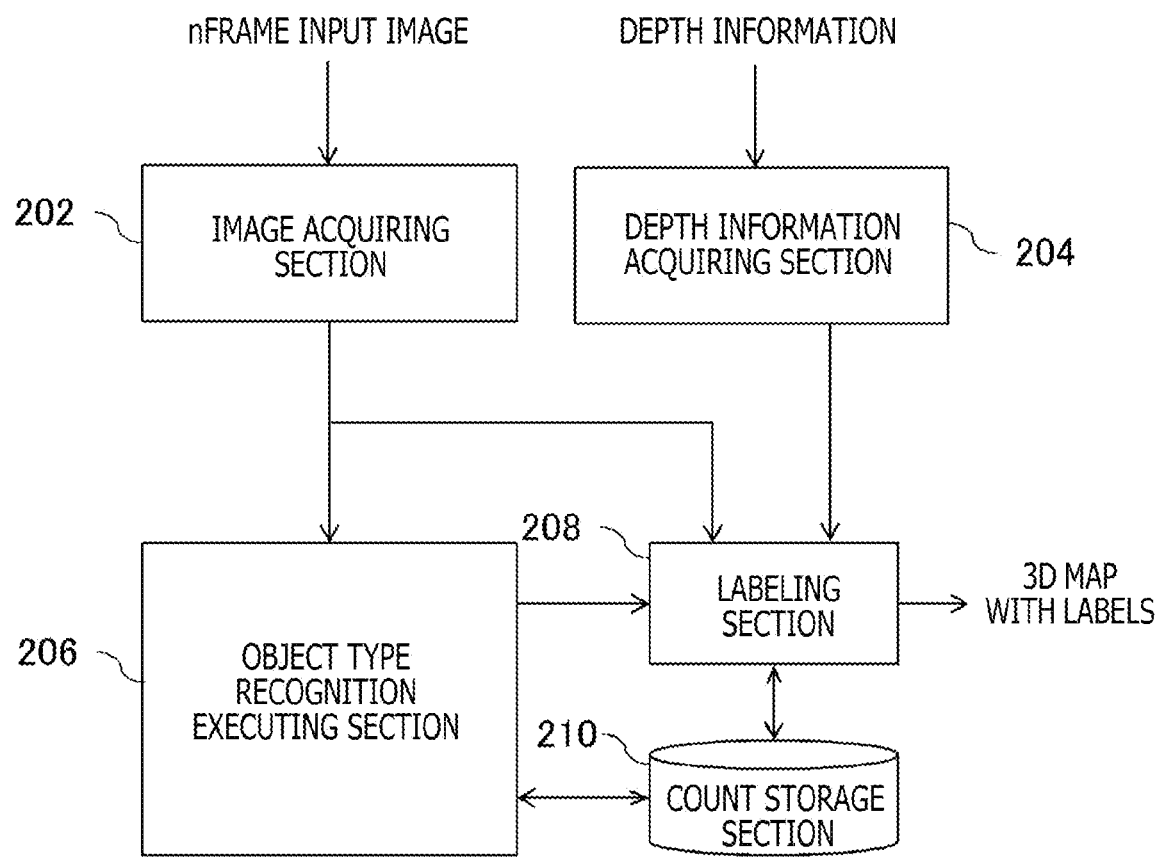

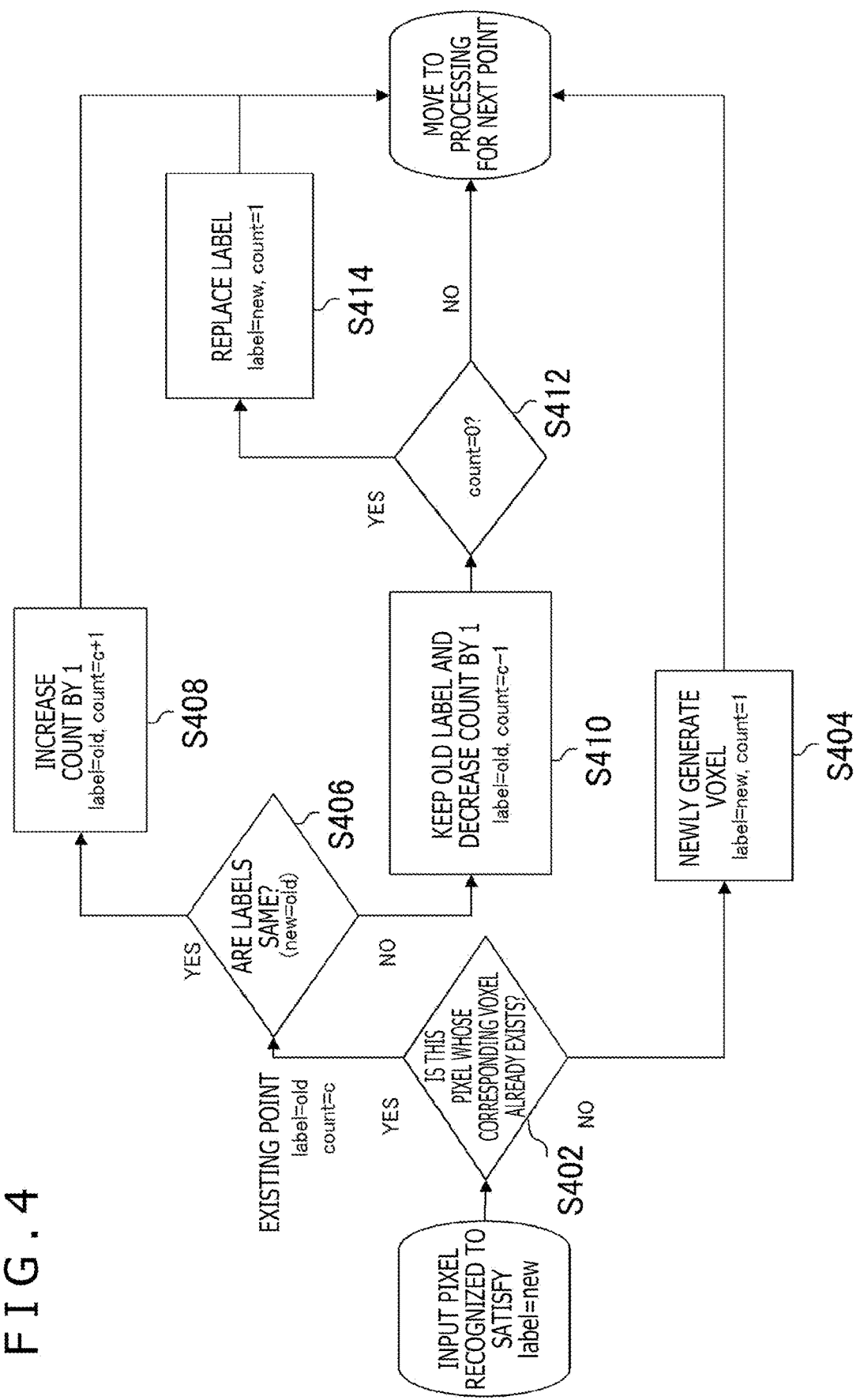

IMAGE PROCESSING DEVICE, IMAGE PROCESSING METHOD, AND PROGRAM

TECHNICAL FIELD

The present invention relates to an image processing device, an image processing method, and a program.

BACKGROUND ART

An object type recognition technique (what is generally called semantic segmentation) that recognizes the type of an object represented by pixels, such as a person, a road, or sky, for each of pixels of an input image, and attaches a label indicating the type to each pixel is known. The object type recognition technique is performed using a machine learning model that has learned using learning data.

In addition, a technique has been known for forming a three-dimensional map by simultaneously performing self-position estimation and three-dimensional position recognition of a subject represented in an input image on the basis of the input image (what is generally called SLAM (Simultaneous Localization and Mapping)).

SUMMARY

Technical Problems

A three-dimensional map includes voxels. When the object recognition technique is applied to the three-dimensional map in order to recognize the type of an object represented by the voxels, an image processing device is overloaded and a long processing time is required.

Further, in order to apply the object recognition technique to the three-dimensional map, a machine learning model that has learned and executes the object recognition technique for the three-dimensional map is required. Further, in order to perform machine learning on the machine learning model, learning data of a three-dimensional map with a label indicating an object type for each voxel attached in advance is required. It is difficult and costly to collect the learning data of the three-dimensional map as compared with collecting learning data which is a two-dimensional image.

The present invention has been made in view of the above problems, and an object thereof is to provide an image processing device, an image processing method, and a program for object recognition of a three-dimensional map in which it is not necessary to collect learning data of a three-dimensional map and high-speed processing with a small load can be performed.

Solution to Problems

An image processing device according to one aspect of the present invention is characterized by including an image acquiring section that sequentially acquires a two-dimensional input image for each frame; an object type recognition executing section that attaches, to each of pixels of the input image acquired for each frame, a label indicating a type of an object represented by the pixels; and a labeling section that executes three-dimensional position recognition of a subject represented in the input image to create a three-dimensional map, based on the input image sequentially input, and attaches, to each voxel included in the three-dimensional map, the label of the pixel corresponding to the voxel.

Further, according to an image processing device according to another aspect of the present invention, it is characterized in that the labeling section attaches the label to the voxel, based on types of labels determined by a plurality of frames.

Further, according to an image processing device according to another aspect of the present invention, it is characterized in that the labeling section, for each voxel, increments a count when the label attached to a previous frame and the label determined based on a current frame are same, decrements the count when the label attached to the previous frame and the label determined based on the current frame are different, attaches the label determined based on the current frame when the count is zero, and keeps the label attached to the previous frame when the count is not zero.

Still further, according to an image processing device according to another aspect of the present invention, it is characterized in that it further includes a storage unit that stores labels determined by a plurality of frames for each voxel, and that the labeling section attaches the label of a type determined most frequently by the plurality of frames to the voxel.

Still further, according to an image processing device according to another aspect of the present invention, it is characterized in that the object type recognition executing section and the labeling section execute semantic segmentation and SLAM in a same frame for each of the acquired input images.

In addition, an image processing method according to one aspect of the present invention is characterized by including an image acquiring step of sequentially acquiring a two-dimensional input image for each frame; an object type recognition executing step of attaching, to each of pixels of the input image acquired for each frame, a label indicating a type of an object represented by the pixels; and a labeling step of executing three-dimensional position recognition of a subject represented in the input image to create a three-dimensional map, based on the input image sequentially input, and attaching, to each voxel included in the three-dimensional map, the label of the pixel corresponding to the voxel.

In addition, a program according to one aspect of the present invention is characterized by causing a computer to execute an image acquiring procedure of sequentially acquiring a two-dimensional input image for each frame; an object type recognition executing procedure of attaching, to each of pixels of the input image acquired for each frame, a label indicating a type of an object represented by the pixels; and a labeling procedure of executing three-dimensional position recognition of a subject represented in the input image to create a three-dimensional map, based on the input image sequentially input, and attaching, to each voxel included in the three-dimensional map, the label of the pixel corresponding to the voxel.

BRIEF DESCRIPTION OF DRAWINGS

FIG. 2 is a functional block diagram illustrating an example of functions implemented in the image processing device according to the embodiment of the present invention.

FIG. 4 is a flow chart illustrating an example of a label determination method.

DESCRIPTION OF EMBODIMENTS

Hereinafter, a first embodiment, which is an embodiment of the present invention, will be described in detail with reference to the drawings. It should be noted that, in the following description, a case where a semantic segmentation technique is applied as an example of the object type recognition technique and a SLAM technique is applied as an example of the three-dimensional map formation technique will be described.

Figure 1:
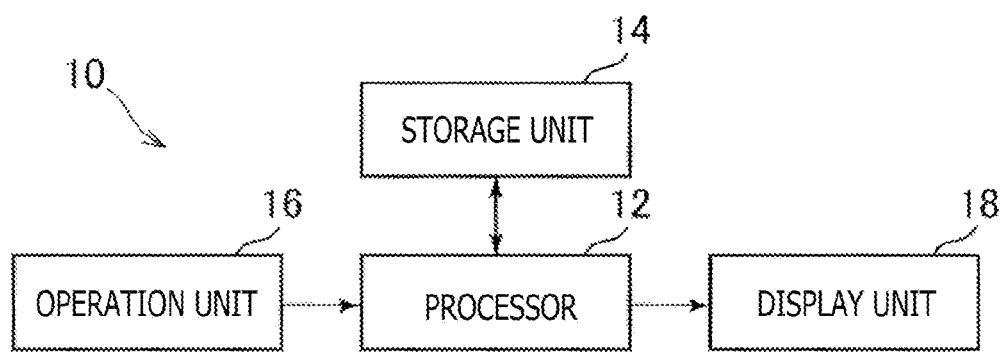
FIG. 1 is a diagram illustrating a configuration of an image processing device according to an embodiment of the present invention.

FIG. 1 is a configuration diagram of an image processing device 10 according to the present embodiment. The image processing device 10 according to the present embodiment is a computer such as a game console or a personal computer, for example. As illustrated in FIG. 1, the image processing device 10 according to the present embodiment includes a processor 12, a storage unit 14, an operation unit 16, and a display unit 18, for example.

The processor 12 is a program control device such as a CPU (Central Processing Unit) that operates according to a program installed in the image processing device 10, for example.

The storage unit 14 is a storage element such as a ROM (Read Only Memory) or a RAM (Random Access Memory), or a hard disk drive. The storage unit 14 stores a program or the like executed by the processor 12.

The operation unit 16 is a user interface such as a keyboard, a mouse, and a controller of a game console, and receives an operation input of a user to output signals indicating the contents thereof to the processor 12.

The display unit 18 is a display device such as a liquid crystal display, and displays various images in accordance with instructions of the processor 12.

Note that the image processing device 10 may include a communication interface such as a network board, an optical disk drive for reading information recorded on an optical disk such as a DVD (Digital Versatile Disk)-ROM or a Blu-ray (registered trademark) disk, a USB (Universal Serial Bus) port, and the like.

A machine learning model having learned is implemented in the image processing device 10 according to the present embodiment. Then, using this machine learning model, a three-dimensional map in which each voxel is labeled with a label of a pixel corresponding to the voxel is generated.

Hereinafter, functions of the image processing device 10 according to the present embodiment and processing executed by the image processing device 10 will be further described.

FIG. 2 is a functional block diagram illustrating an example of the functions implemented in the image processing device 10 according to the present embodiment. It should be noted that the image processing device 10 according to the present embodiment does not have to be equipped with all the functions illustrated in FIG. 2, and may be equipped with functions other than the functions illustrated in FIG. 2.

As illustrated in FIG. 2, the image processing device 10 according to the present embodiment functionally includes an image acquiring section 202, a depth information acquiring section 204, an object type recognition executing section 206, a labeling section 208, and a count storage section 210, for example. The above elements are mainly implemented in the processor 12 and the storage unit 14. The image processing device 10 according to the present embodiment is a machine learning model having executed learning using a two-dimensional image in which a label indicating the type of an object represented by respective pixels is attached to the pixels as learning data.

The image acquiring section 202 sequentially acquires a two-dimensional input image for each frame. To be specific, the image acquiring section 202 sequentially acquires still images of respective frames included in a moving image captured by a general video camera, for example. Here, a still image is a two-dimensional image including grayscale information of each color of red, green, and blue, for example. Further, a position and an orientation of the video camera that captures the input image change with time. Therefore, the image acquiring section 202 acquires two-dimensional images captured while a viewpoint and an angle of view are continuously changing with time.

The depth information acquiring section 204 acquires depth information corresponding to each pixel of the input image acquired by the image acquiring section 202. To be specific, for example, the depth information acquiring section 204 is a distance measuring sensor arranged near a lens of the video camera. The depth information acquiring section 204 measures a distance between the object represented by the pixels and the lens so as to obtain the depth information corresponding to each pixel of the input image each time the image acquiring section 202 acquires an input image of one frame.

It should be noted that the image acquiring section 202 and the depth information acquiring section 204 may be integrally configured. Specifically, for example, in a case where an input image is acquired using a twin-lens video camera, the image acquiring section 202 and the depth information acquiring section 204 can acquire a two-dimensional image including the depth information of each pixel together with the grayscale information of each of the red, green, and blue colors.

The object type recognition executing section 206 attaches, to each of the pixels of the input image acquired for each frame, a label indicating the type of the object represented by the pixels. To be specific, for example, the object type recognition executing section 206 is a machine learning model implemented by a CNN (Convolutional Neural Network). Each time the image acquiring section 202 acquires an input image of one frame, the object type recognition executing section 206 executes semantic segmentation for the input image on the basis of the grayscale information included in the input image. As a result, a label that indicates the type of the object represented by the pixels is attached to each of the pixels of the acquired input image, for each frame.

The labeling section 208 creates a three-dimensional map by executing three-dimensional position recognition of a subject represented in the input image on the basis of the input images sequentially input, and attaches the label of the pixel corresponding to each voxel included in the three-dimensional map to the voxel. To be specific, the labeling section 208 executes SLAM on the basis of the input images sequentially acquired by the image acquiring section 202 and the depth information sequentially acquired by the depth information acquiring section 204. When executing SLAM, the labeling section 208 may perform the three-dimensional position recognition by using position information acquired from a GPS (Global Positioning System) (not illustrated).

Here, the labeling section 208 creates a three-dimensional map from the pixels included in the two-dimensional image by associating each pixel included in the two-dimensional image with a voxel included in the three-dimensional map.

Further, when a three-dimensional map is constructed from the two-dimensional image, a two-dimensional image with a label attached to each pixel is input to the labeling section 208. Therefore, when creating the three-dimensional map, the labeling section 208 can attach the label of the pixel corresponding to each voxel included in the three-dimensional map to the voxel.

The labeling section 208 labels the voxel on the basis of the types of labels determined in the plurality of frames. Specifically, for example, the labeling section 208 attaches the label for the type having been determined most frequently in a plurality of frames to the voxel. Further, as will be described later, the labeling section 208 may attach a label determined by using a count to the voxel.

Note that the object type recognition executing section 206 and the labeling section 208 preferably execute semantic segmentation and SLAM in the same frame for each acquired input image. According to the present embodiment, as described above, when the three-dimensional map is constructed, labeling can be carried out at the same time, so that the load on the processor can be reduced. Therefore, the object type recognition executing section 206 and the labeling section 208 can execute semantic segmentation and SLAM in the same frame.

The count storage section 210 stores the types of the labels determined by a plurality of frames for each voxel. To be specific, for example, the count storage section 210 stores the labels determined during processing of the last 30 frames for each voxel. As a result, the labeling section 208 can attach a label that has been determined most frequently in the 30 frames to each voxel.

The above functions may be implemented by executing, on the processor 12, the program that includes instructions corresponding to the above functions and has been installed in the image processing device 10 which is a computer. This program may be supplied to the image processing device 10 via a computer-readable information storage medium such as an optical disk, a magnetic disk, a magnetic tape, a magneto-optical disk, or a flash memory, or alternatively via the Internet or the like.

Further, the depth information acquiring section 204 may be omitted. To be specific, for example, in a case where the labeling section 208 executes visual SLAM that creates a three-dimensional map without using depth information, the labeling section 208 can simultaneously estimate three-dimensional information of an environment captured by the camera and the position and a posture of the camera, by using a two-dimensional image captured by the camera. Therefore, the labeling section 208 can create a three-dimensional map using only the two-dimensional images sequentially acquired without using the depth information.

Figure 3:
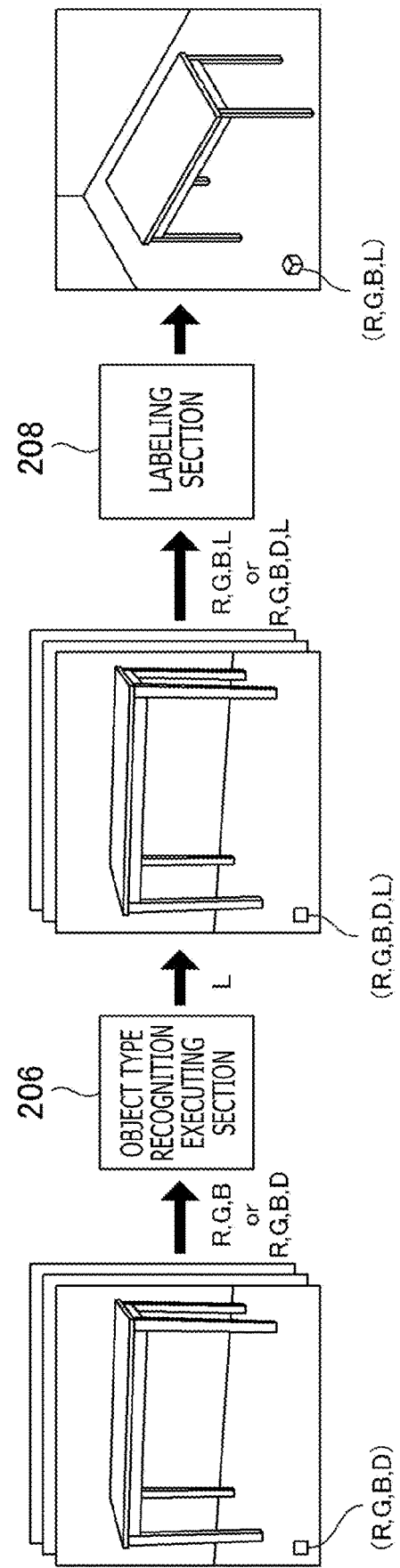
FIG. 3 is a diagram illustrating an example of an image processing method performed by the image processing device.

In the present embodiment, for example, a three-dimensional map with a label attached for each voxel is generated based on a two-dimensional image captured by a general video camera. Hereinafter, a method of creating a three-dimensional map will be described with reference to FIG. 3.

First, the two-dimensional input images sequentially acquired by the image acquiring section 202 frame by frame are input to the object type recognition executing section 206. Specifically, for example, two-dimensional input images captured by a twin-lens video camera are sequentially input to the object recognition executing section frame by frame. Here, each pixel of the input image includes grayscale information representing red, green, and blue, and depth information indicating the distance from the video camera.

The object type recognition executing section 206 attaches, to each of pixels of the input image acquired for each frame, a label indicating the type of the object represented by the pixels. To be specific, the object type recognition executing section 206 determines the type of the object represented by the pixels on the basis of the grayscale information of each pixel of the two-dimensional input image having been input. Then, the object type recognition executing section 206 attaches a label indicating the determined type to each pixel of the input image. For example, in the case of determining that the object represented by certain pixels is a table, the object type recognition executing section 206 labels the pixels with "T." Further, for example, in the case of determining that the object represented by certain pixels is a wall surface, the object type recognition executing section 206 labels the pixels with "W." Therefore, each pixel of the image output by the object type recognition executing section 206 includes information representing a label in addition to the grayscale information and the depth information.

Next, the output image is sequentially input to the labeling section 208 for each frame, and a three-dimensional map is created. To be specific, as described above, a two-dimensional image in which each pixel contains grayscale information, depth information, and information representing a label is input to the labeling section 208. The labeling section 208 creates a three-dimensional map by executing three-dimensional position recognition of the subject represented in the input image on the basis of the grayscale information and the depth information of the input images sequentially input. Here, the three-dimensional map includes voxels corresponding to respective pixels of the two-dimensional input image. Further, since each pixel contains information representing a label in addition to grayscale information and depth information, the label is attached to a voxel of a three-dimensional map, which corresponds to the pixel. By the above method, a three-dimensional map with a label attached to each voxel can be created.

Each time a two-dimensional input image is sequentially input, a voxel corresponding to a pixel included in the input image is formed in the three-dimensional map. Here, in a case where respective pixels of the input images in different frames are recognized as pixels representing the same position in the three-dimensional map, it is determined that these pixels correspond to the same voxel. If the label determination result by the object type recognition executing section 206 is always accurate, respective pixels corresponding to the same voxel should be labeled the same. However, the label determination result by the object type recognition executing section 206 includes an error due to various factors such as an angle at which the input image is captured and a reflection state of light applied to the object. In such a case, in order to create a three-dimensional map with a highly accurate label attached, an example of the determination method of a label attached by the labeling section 208 according to the present embodiment will be described with reference to FIG. 4. Incidentally, in the following, "new," "old," and "c" are each a variable included in a source code.

First, the two-dimensional input image is input to the object type recognition executing section 206. The labeling section 208 determines whether the pixel is one whose corresponding voxel exists in the three-dimensional map currently being created (S402). Incidentally, in the input image, it is assumed that the target pixel is labeled with "new."

In a case where it is determined that the pixel has no corresponding voxel existing, the labeling section 208 newly generates a voxel corresponding to this pixel in the three-dimensional map. Then, the labeling section 208 attaches the label attached to this pixel which is the label "new" to the newly generated voxel (S404). In addition, the voxel is counted as 1 in association with the newly attached label. Incidentally, the count is stored in the count storage section 210. In the case where a new voxel is created, the processing related to this pixel in this frame ends.

On the other hand, in a case where it is determined that a pixel has an existing corresponding voxel, the processing proceeds to step S406. At this time, it is assumed that the label attached to the existing voxel is "old" and the count is "c."

Next, the labeling section 208 determines whether the objects represented by the label "old" attached to the existing voxel and by the label "new" attached to the corresponding pixel of the input image having been newly input are the same (S406).

The labeling section 208 increments the count for each voxel in a case where the label attached to the previous frame and the label determined based on the current frame are the same (S408). Specifically, in the case where the objects represented by the labels "old" and "new" are the same, the labeling section 208 maintains the label of the corresponding voxel as "old" and increments the count "c" attached to this voxel. Then, the processing related to this pixel in this frame ends.

On the other hand, the labeling section 208 decrements the count for each voxel in a case where the label attached to the previous frame and the label determined based on the current frame are different (S410). To be specific, when the objects represented by the labels "old" and "new" are different, the labeling section 208 maintains the label of the corresponding voxel as "old" and decrements the count "c" attached to the voxel.

Then, the labeling section 208 maintains the label attached to the previous frame in a case where the count of the voxel is not 0. That is, "old" is maintained as the label attached to the voxel (S412).

On the other hand, the labeling section 208 attaches the label determined based on the current frame in a case where the count is 0. That is, "new" is attached as a label to be attached to the voxel (S414). Further, at this time, the voxel is counted as 1 in association with the newly attached label.

By determining the label to be attached to each voxel in the above flow, even in a case where the object type recognition executing section 206 has incorrectly labeled in a certain frame, when the correct label is attached in the previous and next frames, the labeling section 208 can label each voxel correctly.

The created three-dimensional map is an assembly of voxels in which each voxel is labeled to indicate the type of the object represented by the voxels. As a result, different processing can be performed for each set of voxels labeled with the same type. To be specific, for example, the created three-dimensional map can be applied to an AR (Augmented Reality) technique. In a case where a three-dimensional map inside a room in which a table, a television, a sofa, and the like are arranged is created, the user can experience a virtual space reflecting the real world room while staying in the real world room. Then, when the user takes some action on an object in the real world corresponding to a specific label, different processing can be performed only on the set of voxels with this label attached in the virtual space. For example, in the real world, in a case where the user takes an action such as touching a part of the table or throwing a ball at a certain part of the television, different processing for each set of voxels with the same label attached can be performed such as a design change of the entire table and turn-on of the power of the television in the virtual space.

It should be noted that the present invention is not limited to the above-described embodiment. Further, specific character strings and numerical values mentioned above and specific character strings and numerical values in the drawings are examples, and thus the strings and values are not limited to these ones. For example, as described above, the label to be attached may not be determined by the count, and the label of the type determined most frequently by a plurality of frames may be attached.

The invention claimed is:

1. An image processing device comprising:
   circuitry configured to:
   sequentially acquire a two-dimensional input image for each frame;
   attach, to each of pixels of the input image acquired for each frame, a label indicating a type of an object represented by the pixels; and
   execute three-dimensional position recognition of a subject represented in the input image to create a three-dimensional map, based on the two-dimensional input image sequentially input, and attach, to each voxel included in the three-dimensional map, the label of the pixel corresponding to the voxel,
   wherein the attaching the label to the voxel is based on types of labels determined by a plurality of frames.

2. The image processing device according to claim 1, wherein, for each voxel, the circuitry is further configured to:
   increment a count when the label attached to a previous frame and the label determined based on a current frame are same,
   decrement the count when the label attached to the previous frame and the label determined based on the current frame are different,
   attach the label determined based on the current frame when the count is zero, and
   keep the label attached to the previous frame when the count is not zero.

3. The image processing device according to claim 1, further comprising:
   memory that stores labels determined by the plurality of frames for each voxel,
   wherein the circuitry is configured to attach the label of a type determined most frequently by the plurality of frames to the voxel.

4. The image processing device according to claim 1, wherein the circuitry is further configured to execute semantic segmentation and simultaneous localization and mapping in a same frame for each of the acquired input images.

5. An image processing method comprising:
   sequentially acquiring a two-dimensional input image for each frame;
   attaching, to each of pixels of the input image acquired for each frame, a label indicating a type of an object represented by the pixels; and
   executing three-dimensional position recognition of a subject represented in the two-dimensional input image to create a three-dimensional map, based on the two-dimensional input image sequentially input, and attaching, to each voxel included in the three-dimensional map, the label of the pixel corresponding to the voxel, and wherein the attaching the label to the voxel is based on types of labels determined by a plurality of frames.

6. A non-transitory computer readable medium comprising computer executable program code configured to instruct at least one computer to perform a method comprising:
sequentially acquiring a two-dimensional input image for each frame;
attaching, to each of pixels of the input image acquired for each frame, a label indicating a type of an object represented by the pixels; and
executing three-dimensional position recognition of a subject represented in the input image to create a three-dimensional map, based on the two-dimensional input image sequentially input, and attaching, to each voxel included in the three-dimensional map, the label of the pixel corresponding to the voxel,
wherein the attaching the label to the voxel is based on types of labels determined by a plurality of frames.

7. The image processing method according to claim 5, wherein the method further comprises, for each voxel:
incrementing a count when the label attached to a previous frame and the label determined based on a current frame are same;
decrementing the count when the label attached to the previous frame and the label determined based on the current frame are different;
attaching the label determined based on the current frame when the count is zero, and
keeping the label attached to the previous frame when the count is not zero.

8. The image processing method according to claim 5, further comprising:
storing, via memory, labels determined by the plurality of frames for each voxel; and
attaching the label of a type determined most frequently by the plurality of frames to the voxel.

9. The image processing method according to claim 5, further comprising executing semantic segmentation and simultaneous localization and mapping in a same frame for each of the acquired input images.

10. The image processing method according to claim 5, wherein the two-dimensional image is sequentially acquired while a viewpoint and an angle of view are continuously changed with time.

11. The image processing method according to claim 5, wherein the method further comprises acquiring, via a distance measuring sensor, depth information corresponding to each pixel of the two-dimensional input image.

12. The non-transitory computer readable medium according to claim 6, wherein the method further comprises, for each voxel:
incrementing a count when the label attached to a previous frame and the label determined based on a current frame are same;
decrementing the count when the label attached to the previous frame and the label determined based on the current frame are different;
attaching the label determined based on the current frame when the count is zero; and
keeping the label attached to the previous frame when the count is not zero.

13. The non-transitory computer readable medium according to claim 6, wherein the method further comprises:
storing, via memory, labels determined by the plurality of frames for each voxel; and
attaching the label of a type determined most frequently by the plurality of frames to the voxel.

14. The non-transitory computer readable medium according to claim 6, wherein the method further comprises executing semantic segmentation and simultaneous localization and mapping in a same frame for each of the acquired input images.

15. The non-transitory computer readable medium according to claim 6, wherein the two-dimensional image is sequentially acquired while a viewpoint and an angle of view are continuously changed with time.

16. The non-transitory computer readable medium according to claim 6, wherein the method further comprises acquiring, via a distance measuring sensor, depth information corresponding to each pixel of the two-dimensional input image.

17. The image processing device according to claim 1, wherein the circuitry is configured to acquire the two-dimensional image while a viewpoint and an angle of view are continuously changed with time.

* * * * *